(12) United States Patent
Courtier

(10) Patent No.: US 6,449,319 B1
(45) Date of Patent: Sep. 10, 2002

(54) RECEIVER WITH A CLOCK SIGNAL GENERATOR

(75) Inventor: Henri Courtier, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/423,703
(22) PCT Filed: Mar. 18, 1999
(86) PCT No.: PCT/IB99/00456
§ 371 (c)(1),
(2), (4) Date: Nov. 12, 1999
(87) PCT Pub. No.: WO99/49582
PCT Pub. Date: Sep. 30, 1999

(30) Foreign Application Priority Data

Mar. 20, 1998 (FR) .............................. 98 03468

(51) Int. Cl.$^7$ ................................ H03K 9/00
(52) U.S. Cl. ................. 375/316; 375/323; 375/334
(58) Field of Search ................ 375/316, 323, 375/324, 326, 329, 331, 332, 340, 334; 331/12, 2, 18, 22, 32, 41, 42, 43, 48; 332/304, 302, 306, 346; 455/141, 146, 147

(56) References Cited

U.S. PATENT DOCUMENTS 5,584,068 A * 12/1996 Mohindra .................. 455/324
5,612,977 A * 3/1997 Ogoro ......................... 375/344
5,768,697 A * 6/1998 Shirakawa ................ 455/181.1
5,825,813 A * 10/1998 Na .............................. 375/324
5,874,913 A * 2/1999 Blanchard et al. .......... 342/352
6,163,229 A * 12/2000 Caspers et al. ............. 332/100

FOREIGN PATENT DOCUMENTS

GB 2310966 A 10/1997 ............ H04B/1/10

* cited by examiner

Primary Examiner—Chi Pham
Assistant Examiner—Emmanuel Bayard
(74) Attorney, Agent, or Firm—Dicran Halajian

(57) ABSTRACT

In a receiver, a reference frequency oscillator (RFO) generates a reference frequency signal having a reference frequency (Fref). A clock circuit derives a clock signal (CLK) from the reference frequency signal. A frequency converter (FRC) converts an input signal (RF) in frequency with a conversion frequency (Fconv) in order to obtain an intermediate frequency signal (IF). The conversion frequency (Fconv) is P times the reference frequency (Fref) divided by M, P and M being integers, P being adjustable. A frequency-shift circuit (FSC) is included for shifting the reference frequency (Fref) with a frequency shift ($\Delta$Fref) which is substantially equal to K times the reference frequency (Fref) divided by a typical value of P (Ptyp) K being an integer ($\Delta$Fref=K·Fref÷Ptyp).

3 Claims, 3 Drawing Sheets

RECEIVER WITH A CLOCK SIGNAL GENERATOR

FIELD OF THE INVENTION

The invention relates to a receiver comprising a reference frequency oscillator for generating a reference frequency signal having a reference frequency, and a clock circuit for deriving a clock signal from the reference frequency signal.

BACKGROUND OF THE INVENTION

GB-A-2 310 966 describes a communication device which includes circuitry operating at a rate set by a system clock signal. The communication device communicates on any one of a plurality of different channels. A clock circuit outputs the system clock signal at a first frequency which generates spurious signals on at least one of a plurality of different channels. The controller shifts the system clock signal by a first pre-determined amount to a second frequency when the communication device is to be tuned to at least one of the plurality of channels so as to remove spurious signals from the at least one of the plurality of channels.

SUMMARY OF THE INVENTION

It is an object of the invention to allow cost-efficient implementations of a receiver as defined in the opening paragraph.

Let it be assumed that the receiver comprises a frequency converter for converting an input signal in frequency with a conversion frequency so as to obtain an intermediate frequency signal, the conversion frequency being P times the reference frequency divided by M, P and M being integers, P being adjustable.

The invention takes the following aspects into consideration. In many receivers, the intermediate frequency signal must be precise enough in frequency to obtain a satisfactory reception quality. The frequency precision of the intermediate frequency signal depends on the frequency precision of the input signal and on the precision of the conversion frequency. The frequency precision of the input signal is generally relatively good and, consequently, the frequency precision of the intermediate frequency signal IF depends substantially on the conversion frequency precision.

Conversion frequencies which are precise enough may be obtained if the reference frequency is fixed and precise. An adjustment of P by one unit involves a change of the conversion frequency which is equal to the reference frequency divided by M. By changing P unit by unit, a grid of conversion frequencies is thus obtained in which the distance between two adjacent conversion frequencies is the reference frequency divided by M. With such a grid, a relatively satisfactory frequency precision can be obtained at the level of the intermediate frequency so that a satisfactory reception quality is obtained.

In the background art, a synthesizer circuit is used for deriving the clock signal from the reference frequency signal. Accordingly, it is possible to shift the clock signal in frequency while the reference frequency remains fixed. By shifting the clock signal in frequency, it can be prevented that the clock signal causes interference in a channel to which the receiver needs to be tuned.

In accordance with the invention, the receiver comprises a frequency shift circuit for shifting the reference frequency with a frequency shift which is substantially equal to K times the reference frequency divided by a typical value of P, K being an integer. Accordingly, by shifting the reference frequency with the aforementioned frequency shift, it can be prevented that the clock signal causes interference in a desired channel, without substantially affecting the conversion frequency precision. The conversion frequency remains substantially at the grid of conversion frequencies which would be obtained if the reference frequency were not shifted. Since the conversion frequency remains substantially at this grid, the frequency precision at the level of the intermediate frequency is not too much influenced by the fact that the reference oscillator is shifted in frequency. Consequently, the invention allows a satisfactory reception quality without this requiring a synthesizer circuit for deriving the clock signal from the reference frequency signal. Thus, the invention allows cost-efficient implementations.

These and other aspects of the invention are apparent from and will be elucidated, by way of non-limitative example, with reference to the embodiments described hereinafter.

DETAILED DESCRIPTION OF THE INVENTION

The following remarks relate to the reference symbols. Similar entities are defined by a character reference which is identical in all Figures. Several similar entities may appear in a single Figure. In this case, a number is added to the character reference so as to distinguish between the similar entities. The number is between parentheses if the plurality of similar entities is variable. The number may be omitted for reasons of convenience. This applies to the description as well as to the claims.

Figure 1:
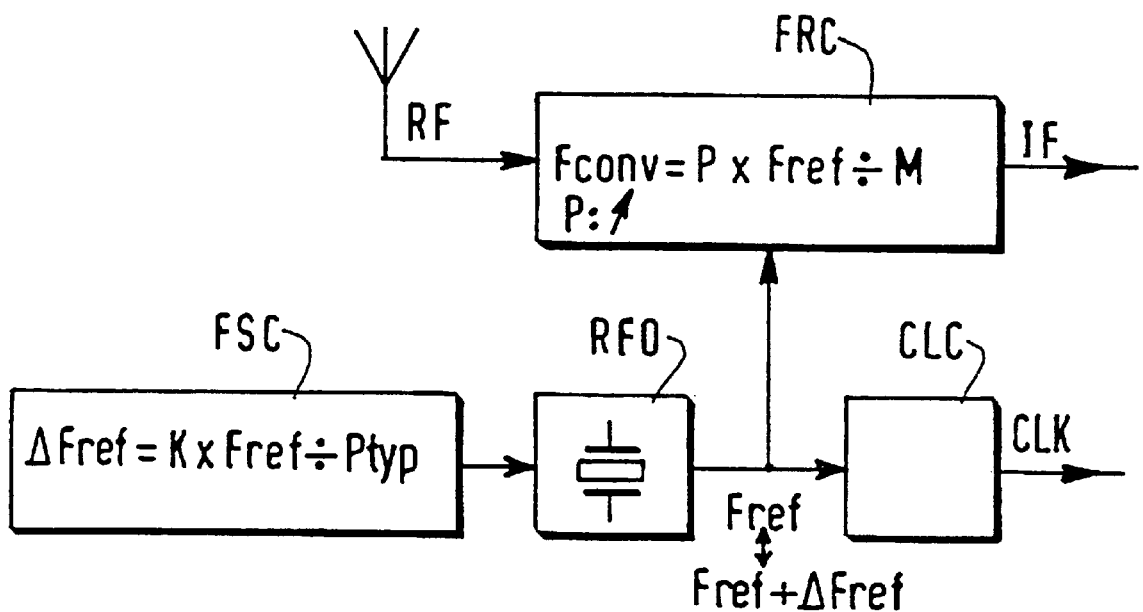
FIG. 1 is a conceptual diagram illustrating basic characteristics of the invention as defined in claim 1.

FIG. 1 illustrates the basic characteristic features of the invention A reference frequency oscillator RFO generates a reference frequency signal having a reference frequency Fref. A clock circuit derives a clock signal CLK from the reference frequency signal. A frequency converter FRC converts an input signal RF in frequency with a conversion frequency Fconv so as to obtain an intermediate frequency signal IF. The conversion frequency Fconv is P times the reference frequency Fref divided by M, P and M being integers, P being adjustable. A frequency-shift circuit FSC is included for shifting the reference frequency Fref with a frequency shift ΔFref which is substantially equal to K times the reference frequency Fref divided by a typical value of P (Ptyp), K being an integer. That is, ΔFref=K·Fref÷Ptyp.

The following aspects have been taken into consideration to advantageously implement to the basic characteristic features illustrated in FIG. 1. In practice, P will generally be defined by a frequency converter control value which is applied to the frequency converter FRC. For each channel to which the frequency converter FRC needs to be tuned, there is a specific value of P and thus a specific frequency converter control value. It is possible store all these frequency converter control values in a memory. However, this requires a relatively large memory so that this approach is relatively costly.

Generally, the channels are present on a frequency grid in which the frequency distance between two adjacent channels is fixed. Supposing that the reference frequency Fref is not shifted, the frequency converter control values for the different channels constitute a grid in which the difference between two adjacent values is fixed. Such a regularity allows the frequency converter control value to be obtained for any channel in a less costly way than storing all the values in a memory. However, since the reference frequency Fref will be shifted for one or more channels, such a regularity of values does not exist.

Figure 2:
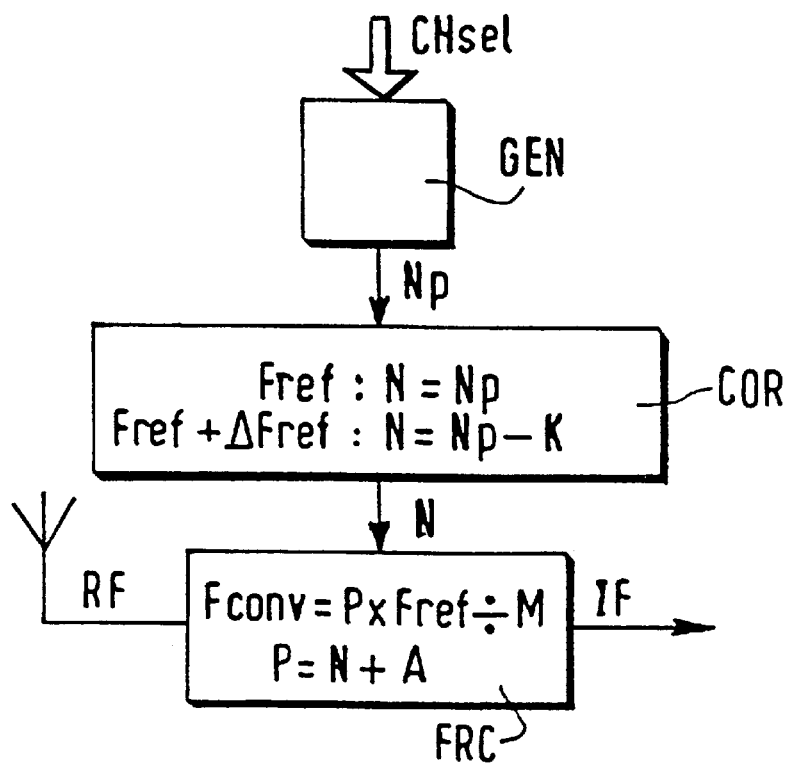
FIG. 2 is a conceptual diagram illustrating additional characteristics as defined in claims 2 and 3.

FIG. 2 illustrates the following characteristic features. A generator GEN generates a preliminary frequency converter control value Np in response to a channel select command CHsel. A corrector COR supplies a frequency converter control value N to the frequency converter FRC in response to the preliminary frequency converter control value Np. The frequency converter control value N is the preliminary frequency converter control value Np in the case where the reference frequency Fref is not shifted. The frequency converter control value N is the preliminary frequency converter control value Np minus K in the case where the reference frequency Fref is shifted. In the frequency converter FRC, P is equal to the frequency converter control value N plus an arbitrary integer A including zero: P=N+A.

The characteristic features illustrated in FIG. 2 have the following effects and advantages. The preliminary frequency control values Np will be on a grid in which the difference between two adjacent values is fixed. Thus, this allows a relatively easy realization of the generator GEN which supplies these values. The corrector COR may also be realized in a simple manner, for example, in the form of a subtracter which either receives zero or a fixed value equal to K. The characteristic features illustrated in FIG. 3 thus contribute to the economy of an embodiment.

Figure 3:
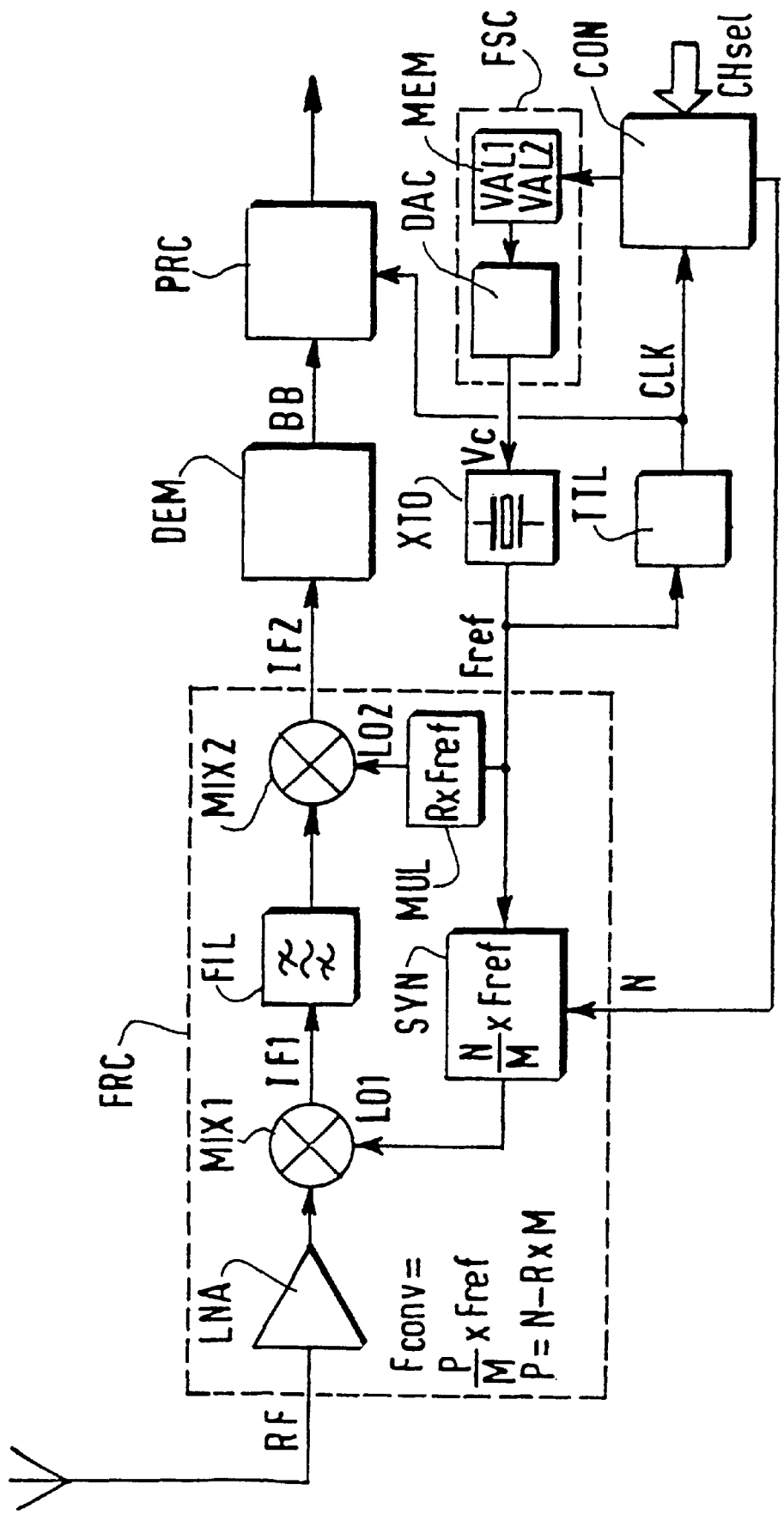
FIG. 3 is a block diagram illustrating an embodiment of a receiver according to the invention.

FIG. 3 illustrates an example of a receiver which recaptures the characteristic features illustrated in FIGS. 1 and 2. The receiver comprises a frequency converter FRC, a demodulator DEM, a baseband processor PRC. It further comprises a crystal oscillator XTO, a logic circuit TTL, a frequency-shift circuit FSC, a memory MEM, and a controller CON. In more detail, the frequency converter FRC comprises an input amplifier LNA, a first and a second mixer MIX1, MIX2, a filter FIL, a synthesizer SYN and a frequency multiplier MUL. The frequency-shift circuit FSC comprises a memory MEM and a D/A-converter DAC.

The receiver illustrated in FIG. 3 operates as follows. The frequency converter FRC converts an input signal RF in frequency with a conversion frequency Fconv, so as to obtain an intermediate frequency signal IF2. The conversion frequency Fconv is determined by a synthesizer control value N provided by the controller CON, and a reference frequency Fref provided by the crystal oscillator XTO. The demodulator DEM derives a baseband signal BB from the intermediate frequency signal IF2. The baseband processor PRC processes the baseband signal BB, for example, so as to derive a sound signal and control commands.

The baseband processor PRC and the controller CON operate under the control of a clock signal CLK. The TTL circuit derives the clock signal CLK from the reference frequency Fref provided by the crystal oscillator XTO. The reference frequency Fref can be shifted by means of a control voltage Vc provided by the D/A converter DAC. The control voltage Vc is defined by a value VAL which is read from the memory MEM and supplied to the D/A converter DAC. In response to a channel select command CHsel, the controller CON selects one of two possible value VAL1 or VAL2 to be read out from the memory MEM and calculates the synthesizer control value N which should be applied to the frequency converter FRC.

In the frequency converter FRC, the input amplifier LNA amplifies the input signal RF. The first mixer MIX1 mixes the amplified input signal with a first mixing signal LO1 supplied by the synthesizer SYN. The first mixing signal LO1 has a frequency which is higher than that of the input signal RF. The frequency of the first mixing signal LO1 is N to M times the reference frequency Fref, N being the synthesizer control value and M being an integer. The first mixer MIX1 thus converts the amplified input signal in frequency, which yields a preliminary intermediate frequency signal IF1. After filtering by the filter FIL1, the second mixer MIX2 mixes this signal IF1 with a second mixing signal LO2 supplied by the frequency multiplier MUL which receives an output signal from the crystal oscillator XTO. The frequency of the second mixing signal LO2 is a multiple R of the reference frequency Fref. The second mixer MIX2 thus converts the preliminary intermediate frequency signal IF1 in frequency, which yields the intermediate frequency signal IF2 supplied by the frequency converter FRC. The intermediate frequency IF2 is lower than the preliminary intermediate frequency IF1.

The conversion frequency Fconv of the frequency converter FRC is thus $(N \div M - R) \cdot Fref$. This may be re-written as $Fconv = (N - R \times M) \times Fref \div M$. Thus, it follows that $P = N - R \times M$. The minus sign before the integer R is due to the fact that the first mixing signal LO1 has a frequency which is higher than that of the input signal RF, whereas the intermediate frequency IF2 is lower than the preliminary intermediate frequency IF1.

Figure 4:
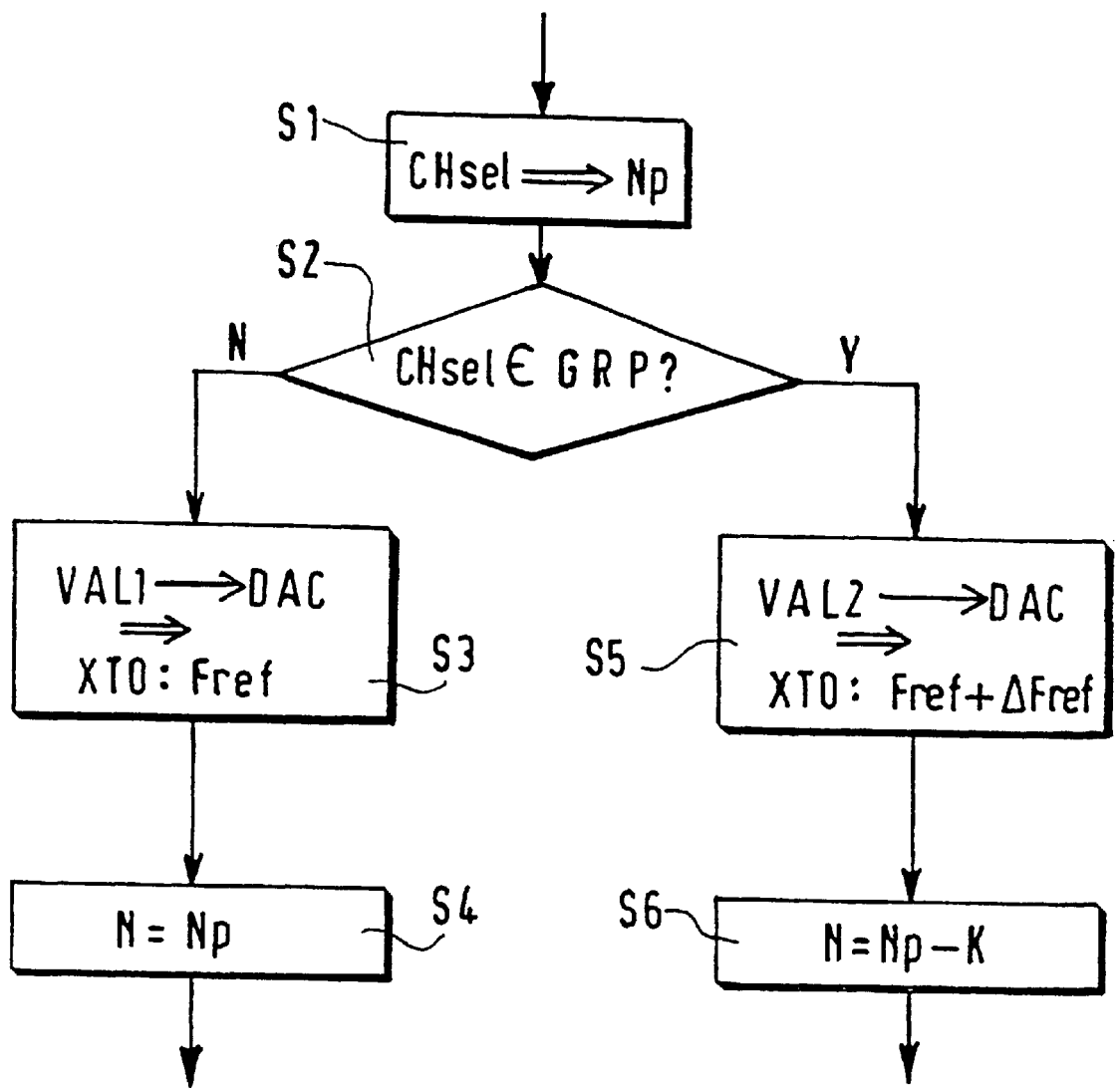
FIG. 4 is a flow chart illustrating a method of tuning the receiver illustrated in FIG. 3.

FIG. 4 illustrates a method for tuning the receiver illustrated in FIG. 3. In step S1, the controller CON calculates a preliminary synthesizer control value Np on the basis of a channel select command generator CHsel it receives (CHsel⇒Np). In step S2, the controller CON checks whether the channel select command CHsel belongs to a group GRP of special channel select commands (CHsel∈GRP?). The group GRP is formed by channel commands CHsel associated to channels in which the clock signal CLK would cause interference if the reference frequency Fref were not shifted. If the channel select command CHsel does not belong to the group GRP of special channel select commands, the controller CON carries out steps S3 and S4. If the channel select command belongs to the group GRP of special channel select commands, the controller CON carries out steps S5 and S6.

Let it be assumed that the channel select command CHsel does not belong to the group GRP of special channel select commands. In step S3, the controller CON selects the value VAL1 to be read out from the memory MEM such that the value VAL1 is supplied to the D/A converter DAC. As a result, the reference frequency will be Fref which is the default reference frequency (VAL1→DAC⇒XTO:Fref). In step S4, the controller supplies a synthesizer control value N to the synthesizer SYN, the synthesizer control value N being equal to the preliminary synthesizer control value Np (N=Np).

Let it be assumed that the channel select command CHsel does belong to the group GRP of special channel select commands. In step S5, the controller CON selects the value VAL2 to be read out from the memory MEM such that the value VAL2 is supplied to the D/A converter DAC. As a result, the reference frequency will be Fref+ΔFref which is the shifted reference frequency (VAL2→DAC⇒XTO:Fref+ΔFref). In step S6, the controller CON supplies a synthesizer control value N to the synthesizer SYN, the frequency synthesizer control value N is the preliminary synthesizer control value minus K (N=Np−K), K being an integer including negative values.

The difference ΔFref between the default reference frequency and the shifted reference frequency, is substantially equal to K times the default reference frequency Fref divided by a typical value of P (Ptyp). Supposing K is a positive value, the reference frequency is thus somewhat increased for channels for which the clock signal CLK would cause interference if the reference frequency Fref were not shifted. In contrast, if K is a negative value, the reference frequency is somewhat decreased for such channels.

The receiver illustrated in FIG. 3 may form part, for example, of a mobile phone operating in accordance with a mobile phone standard commonly referred to as N-AMPS. By way of example, values are given for various parameters in the FIG. 3 receiver. The reference frequency Fref is 15.36 MHz and the integer M is 1536. Consequently, the conversion frequency Fconv can be varied in steps of 10 kHz by varying the synthesizer control value N unit-by-unit. The preliminary intermediate frequency IF1 is at 92.61 MHz and the intermediate frequency IF is at 450 kHz. The second mixing signal LO2 has a frequency of 92.16 MHz which is six times the reference frequency Fref such that R=6.

Harmonics of the reference frequency Fref may cause interference in channel numbers 112, 184, 368, 440, 624 and 696. Thus, the reference frequency Fref should be shifted if the receiver is tuned to such a special channel number. As explained hereinbefore, the frequency shift ΔFref should substantially be a multiple K times the reference frequency Fref divided by a typical value of P (Ptyp).

The typical value of P (Ptyp) is determined as follows. Channel number 404 is in the middle between the lowest and the highest special channel number, 112 and 696 respectively, for which the reference frequency Fref needs to be shifted. The value of P for which the receiver is tuned to channel number 404 is taken as the typical value of P (Ptyp). An input signal RF in channel number 404 has a frequency of 882.12 MHz. Accordingly, in order to tune the receiver to this frequency, the first mixing signal LO1 needs to have a frequency of 882.12+92.61 MHz which is 974.73 MHz. Thus, the synthesizer control value N needs to be 97473. Thus, the typical synthesizer control value Ntyp is 97473. Since Ptyp=Ntyp−R×M with Ntyp=97473, R=6, M=1536, it follows that Ptyp=88257.

Thus, the frequency shift ΔFref should be a multiple K of 174 Hz which is the reference frequency 15.36 MHz divided by the typical value Ptyp of P being 88257 as calculated above. For example, let it be assumed that K=+2. This implies that the reference frequency Fref is 348 Hz higher for tuning the receiver to a special channel number, compared with the reference frequency Fref for tuning the receiver to an ordinary channel number.

Nevertheless, let it be assumed that the reference frequency Fref is shifted ΔFref=+2×174 Hz=348 Hz when the receiver is tuned to channel number 404 which is an ordinary channel number. It has been explained hereinbefore that, when the reference frequency Fref is not shifted, the synthesizer control value N should be 97473 for tuning the receiver to that channel. However, since the reference frequency Fref is shifted, a different synthesizer control value N will be needed to tune the receiver to channel number 404.

Since it has been assumed that the reference frequency Fref is shifted by ΔFref=+2×174 Hz, the synthesizer control value N needs to be 97473 minus K, that is 97473 minus 2. In that case, the first mixing signal LO1 will have a frequency of (97471÷1536)×15,360,348 Hz which is 974,732,088 Hz. Accordingly, the preliminary intermediate frequency IF1 signal will have a frequency of 92,612,088 Hz. The second mixing signal LO2 will have a frequency of 92,162,088 Hz. Accordingly, the intermediate frequency signal IF2 will have a frequency of 450,000 Hz. Thus, shifting the reference frequency Fref has not affected the frequency precision of the intermediate frequency signal IF2. Consequently, this signal will be correctly positioned with respect to one or more filters at 450 kHz providing adjacent channel selectivity. Referring to FIG. 3, such filters may be included in the demodulator DEM.

In practice, it may be desirable to shift the reference frequency Fref by an amount which slightly differs from K times the reference frequency Fref divided by a typical value of P (Ptyp). For example, let it be assumed that the reference frequency Fref is also used to generate a transmit signal which needs to be precise in frequency. Thus, shifting the reference frequency Fref will affect the frequency precision of the transmit signal. Consequently, a compromise needs to be made between the frequency precision of the intermediate frequency signal IF2 and the frequency precision of the transmit signal. To give an example, in a reduction to practice it has been found that a frequency shift ΔFref of 360 Hz was a better comprise than the frequency shift ΔFref of 348 Hz calculated hereinbefore.

The Figures and their description above illustrate rather than limit the invention. It will be evident that there are numerous alternatives which are within the scope of the appendent claims. Some final remarks will be made in this respect.

Referring to the receiver illustrated in FIG. 3, it should be noted that a whole series of values VAL could be stored in the memory MEM. The controller CON may then, for a given synthesizer control value N, select the value for which the best reception quality is obtained. To that end, the method illustrated in FIG. 4 may be modified as follows. In step S5, the controller selects a value from the memory MEM in dependence on the channel select command CHsel, instead of always selecting the value VAL2. In effect, the controller CON selects amongst various frequency shifts which slightly differ but have in common that they are substantially equal to K times the reference frequency Fref divided by a typical value of P (Ptyp).

The functional units or functions may be divided into numerous different ways. In this respect it should be noted that the Figures are very diagrammatic and that each Figure solely represents a single embodiment. Although a Figure shows functional units in separate blocks, this does not at all exclude the fact that several functional units are implemented in a single physical unit. For example, referring to FIG. 3, the memory MEM and the D/A converter DAC may be included in the controller CON.

What is claimed is:

1. A receiver comprising:
   a reference frequency oscillator for generating a reference frequency signal having a reference frequency, and
   a clock circuit for deriving a clock signal from the reference frequency signal;
   wherein the receiver comprises:

a frequency converter for converting an input signal in frequency with a conversion frequency in order to obtain an intermediate frequency signal, the conversion frequency being P times the reference frequency divided by M, P and M being integers, P being adjustable; and a frequency-shift circuit for shifting the reference frequency with a frequency shift which is substantially equal to K times the reference frequency divided by a typical value of P, K being an integer.

2. A receiver as claimed in claim 1, further comprising:

a generator for generating a preliminary frequency converter control value in response to a channel select command;

a corrector for supplying a frequency converter control value to the frequency converter in response to the preliminary frequency converter control value, the frequency converter control value being the preliminary frequency converter control value in the case where the reference frequency is not shifted, and the frequency converter control value being the preliminary frequency converter control value minus K in the case where the reference frequency is shifted, P being equal to the frequency converter control value plus an arbitrary integer including zero.

3. A method of tuning a receiver as claimed in claim 1, wherein the method comprises:

generating a preliminary frequency converter control value in response to a channel select command;

supplying a frequency converter control value to the frequency converter in response to the preliminary frequency converter control value, the frequency converter control value being the preliminary frequency converter control value in the case where the reference frequency is not shifted, and the frequency converter control value being the preliminary frequency converter control value minus K in the case where the reference frequency is shifted, P being equal to the frequency converter control value plus an arbitrary integer including zero.

* * * * *